United States Patent
Lee et al.

(10) Patent No.: US 11,933,809 B2
(45) Date of Patent: Mar. 19, 2024

(54) INERTIAL SENSOR

(71) Applicant: SENSORTEK TECHNOLOGY CORP., Zhubei (TW)

(72) Inventors: Shih-Wei Lee, Zhubei (TW); Chia-Hao Lin, Zhubei (TW); Shih-Hsiung Tseng, Zhubei (TW); Kuan-Ju Tseng, Zhubei (TW); Chao-Shiun Wang, Zhubei (TW)

(73) Assignee: SENSORTEK TECHNOLOGY CORP., Zhubei (TW)

( * ) Notice: Subject to any disclaimer, the term of this patent is extended or adjusted under 35 U.S.C. 154(b) by 0 days.

(21) Appl. No.: 17/658,139

(22) Filed: Apr. 6, 2022

(65) Prior Publication Data
US 2023/0055638 A1   Feb. 23, 2023

Related U.S. Application Data

(60) Provisional application No. 63/171,156, filed on Apr. 6, 2021.

(51) Int. Cl.
*G01P 15/08* (2006.01)
*G01P 15/125* (2006.01)
*G01P 15/18* (2013.01)

(52) U.S. Cl.
CPC ............ *G01P 15/08* (2013.01); *G01P 15/125* (2013.01); *G01P 15/18* (2013.01)

(58) Field of Classification Search
CPC ......... G01P 15/125; G01P 15/18; G01P 15/08
See application file for complete search history.

(56) References Cited

U.S. PATENT DOCUMENTS

| | | | |
|---|---|---|---|
| 11,333,679 B1* | 5/2022 | Senkal | G01P 15/131 |
| 2007/0214891 A1* | 9/2007 | Robert | G01P 15/0802 |
| | | | 73/514.32 |
| 2009/0308159 A1* | 12/2009 | Frey | G01P 15/0802 |
| | | | 73/514.32 |
| 2013/0104654 A1* | 5/2013 | Classen | B81B 3/0072 |
| | | | 73/514.16 |

(Continued)

FOREIGN PATENT DOCUMENTS

| CN | 110879303 A | 3/2020 |
|---|---|---|
| CN | 111273057 A | 6/2020 |
| TW | 201209414 A | 3/2012 |

OTHER PUBLICATIONS

First Office Action mailed to Taiwanese Counterpart Application No. 111113128 dated May 2, 2023.

(Continued)

*Primary Examiner* — Helen C Kwok
(74) *Attorney, Agent, or Firm* — ROSENBERG, KLEIN & LEE

(57) ABSTRACT

The present application discloses an inertial sensor comprising a proof mass, an anchor, a flexible member and several sensing electrodes. The anchor is positioned on one side of the sensing, mass block in a first axis. The flexible member is connected to the anchor point and extends along the first axis towards the proof mass to connect the proof mass, in which the several sensing electrodes are provided. In this way, the present application can effectively solve the problems of high difficulty in the production and assembly of inertial sensors and poor product reliability thereof.

14 Claims, 8 Drawing Sheets

(56) References Cited

U.S. PATENT DOCUMENTS

| | | | | |
|---|---|---|---|---|
| 2014/0251011 | A1* | 9/2014 | Zhang | G01P 15/08 |
| | | | | 73/514.16 |
| 2015/0000403 | A1* | 1/2015 | Liukku | G01P 15/18 |
| | | | | 73/510 |
| 2015/0268269 | A1* | 9/2015 | Jia | G01P 15/125 |
| | | | | 73/514.32 |
| 2016/0097792 | A1* | 4/2016 | Naumann | G01P 15/18 |
| | | | | 73/504.02 |
| 2017/0023608 | A1* | 1/2017 | Tang | G01P 15/18 |
| 2017/0315147 | A1* | 11/2017 | Acar | G01P 15/125 |
| 2018/0275161 | A1* | 9/2018 | Tang | G01P 15/125 |
| 2019/0100426 | A1* | 4/2019 | Painter | B81B 3/0086 |
| 2019/0339078 | A1* | 11/2019 | McNeil | G01P 15/18 |
| 2020/0241035 | A1* | 7/2020 | Classen | G01P 15/125 |
| 2021/0215735 | A1* | 7/2021 | Tseng | G01P 1/00 |

OTHER PUBLICATIONS

Search Report mailed to Taiwanese Counterpart Application No. 111113128 dated May 2, 2023.

* cited by examiner

INERTIAL SENSOR

FIELD OF THE INVENTION

The present application generally relates to an inertial sensor, particularly to an inertial sensor performing multi-axis sensing using a proof mass.

BACKGROUND OF THE INVENTION

In modern consumer electronics, to enhance the functionality of electronic products, it is required to include sensing devices capable of measuring inertial motions accurately, for example, inertial sensors for measuring physical quantities such as accelerations or angular velocities. In general, a free object in a three-dimensional space includes accelerations in all directions and angular velocities in all rotational directions. To accurately trace the motion of the object, the accelerations along the axes and about the axes of a three-dimensional coordinates system must be measured. Accordingly, a high-resolution and low-cost inertial sensing device is required.

An inertial sensing device is used to measure the acceleration caused by inertial force and can be applied to many fields. For example, the advancement of human-machine interactive interfaces leads to rapid development of various modern electronic products. By intuitive operations using human bodies, such as switching the screen by flipping an electronic product, the user interface will be simplified and the user experience will be enhanced. In addition, by sensing body motions, advanced gaining experiences will be achieved. Most electronic products adopt inertial sensing devices such as accelerometers to achieve the above function. When an inertial force deforms a mechanical structure, the acceleration or angular velocity can be deduced using various sensing methods. Thanks to the development of microelectromechanical systems, micro inertial sensors with integrated mechanical devices and circuits using semiconductor technologies own the advantages of low cost and compact size.

According to the sensing methods, micro inertial sensors can be categorized into many types. Please refer to FIG. 1, which shows a schematic diagram of the architecture of an inertial sensor according to the prior art. The inertial sensor according to the prior art comprises a proof mass 91, an anchor 92, and a plurality of flexible members 93. As shown in the figure, the anchor 92 can be disposed at the center of an accommodating space in the proof mass 91. Two flexible members are connected to both sides of the anchor 92 for connecting the anchor 92 to the proof mass 91 via the two flexible members 93. Thereby, when the proof mass 91 is displaced by acceleration, the two flexible members 93 will deform in different directions correspondingly and changing the distances between the flexible members and sensing electrodes. The changes are read by the operational circuit of the device and converted to signals representing the acceleration. Consequently, the inertial sensor can provide accelerations in three axes by using the proof mass 91 and the deformations of the plurality of flexible members 93.

Unfortunately, the inertial sensor according to the prior art as described above faces some problems. To implement symmetry in architecture, the inertial sensor according to the prior art adopts a pair of flexible members 93, which will increase the geometrical nonlinearity in specific conditions and result in stress concentration. For example, when a device is under stringent testing conditions such as chip-level rolling, the inertial force along more than one axis will be applied and thus possibly triggering accidental motions. Since the inertial sensor is not designed for this condition, the induced stress in such tests will be apparently higher than the stress induced in normal motions. Consequently, the flexible members 93 might be over-stressed and damaged or even broken.

Even worse, because the sensing sensitivity of the inertial sensor according to the prior art depends on the deformation of the flexible members 93, to ensure sufficient deformation of the flexible members 93 when the force is applied on the proof mass 91, the cross-sectional area of the flexible members 93 must be designed as small as possible. Unfortunately, this increases the difficulty in producing and assembling the flexible members 93 substantially. Besides, the smaller the cross-sectional area of the flexible members 93, the lower the stress that the flexible members 93 can sustain, and hence deteriorating the reliability concern due to stress concentration as described above.

SUMMARY

The present application provides an improved inertial sensor to solve the problems of difficulty in production and assembly and low product reliability as described above.

To achieve the above objective, the present application provides an inertial sensor, which comprises a proof mass, an anchor, a flexible member, and a plurality of sensing electrodes. The anchor is disposed on one side of the proof mass along a first axis. The flexible member is connected to the anchor and extends along the first axis towards the proof mass for connecting to the proof mass. The plurality of sensing electrodes are disposed on the proof mass.

By adopting an asymmetrical structure with a single flexible member connected to the anchor, the stress concentration problem can be prevented. In other words, even if the induced stress is much higher than the stress in normal motions, a device will not damage or even break easily. In addition, compared with the prior art, there is more design flexibility for the cross-sectional area of the flexible member in the inertial sensor according to the present application. Thereby, the difficulty in producing and assembling the flexible member can be reduced effectively. Since the flexible member has a larger cross-sectional area, the product reliability can be further improved.

DETAILED DESCRIPTION

In order to make the structure and characteristics as well as the effectiveness of the present application to be further understood and recognized, the detailed description of the present application is provided as follows along with embodiments and accompanying figures.

Figure 2:
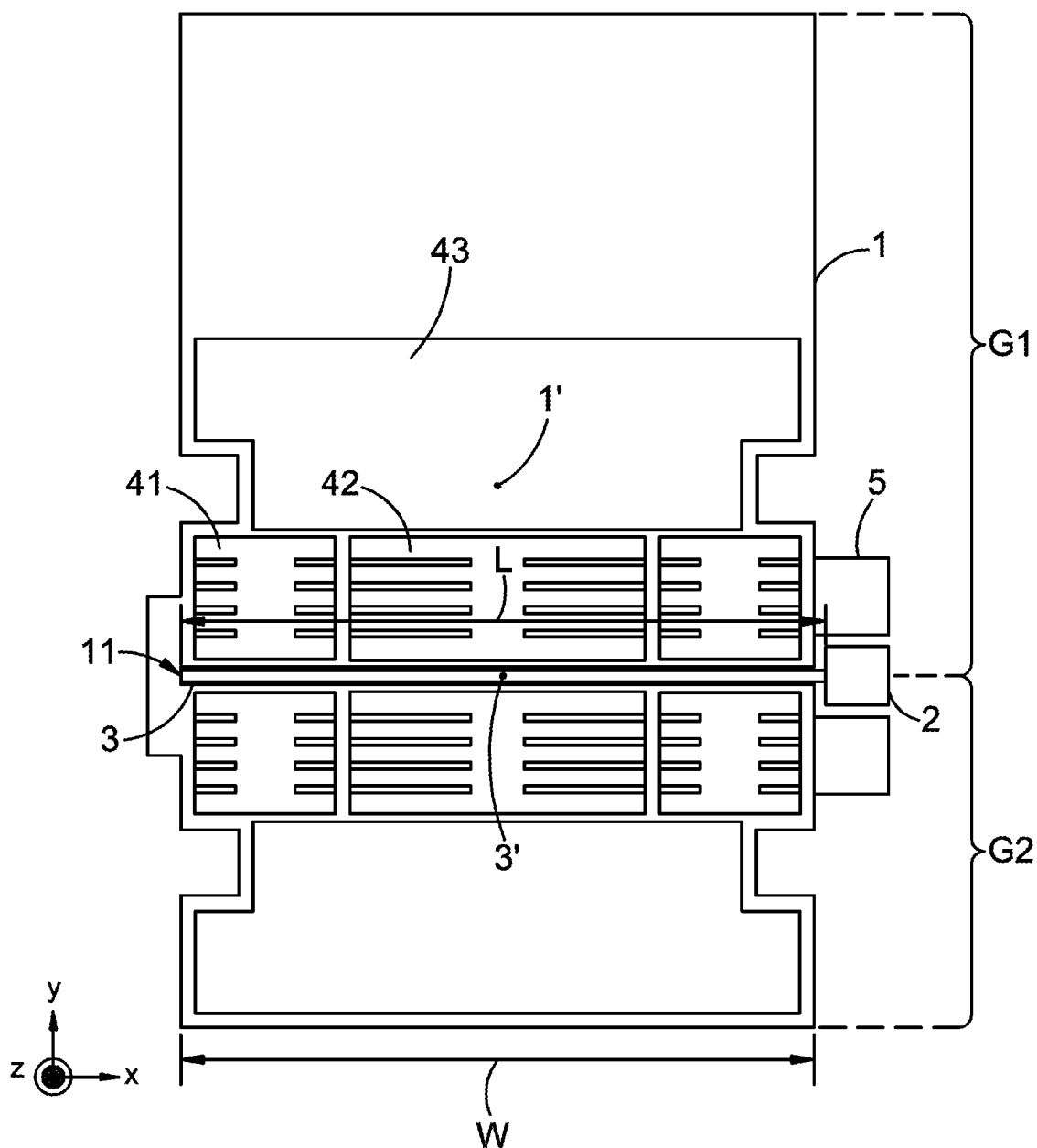
FIG. 2 shows a structural schematic diagram of the inertial sensor according to the first embodiment of the present application.

Please refer to FIG. 2, which shows a structural schematic diagram of the inertial sensor according to the first embodiment of the present application. The inertial sensor according to the present application comprises a proof mass 1, an anchor 2, a flexible member 3, a plurality of sensing electrodes 41, 42, 43, and a balance mass 5.

Figure 1:
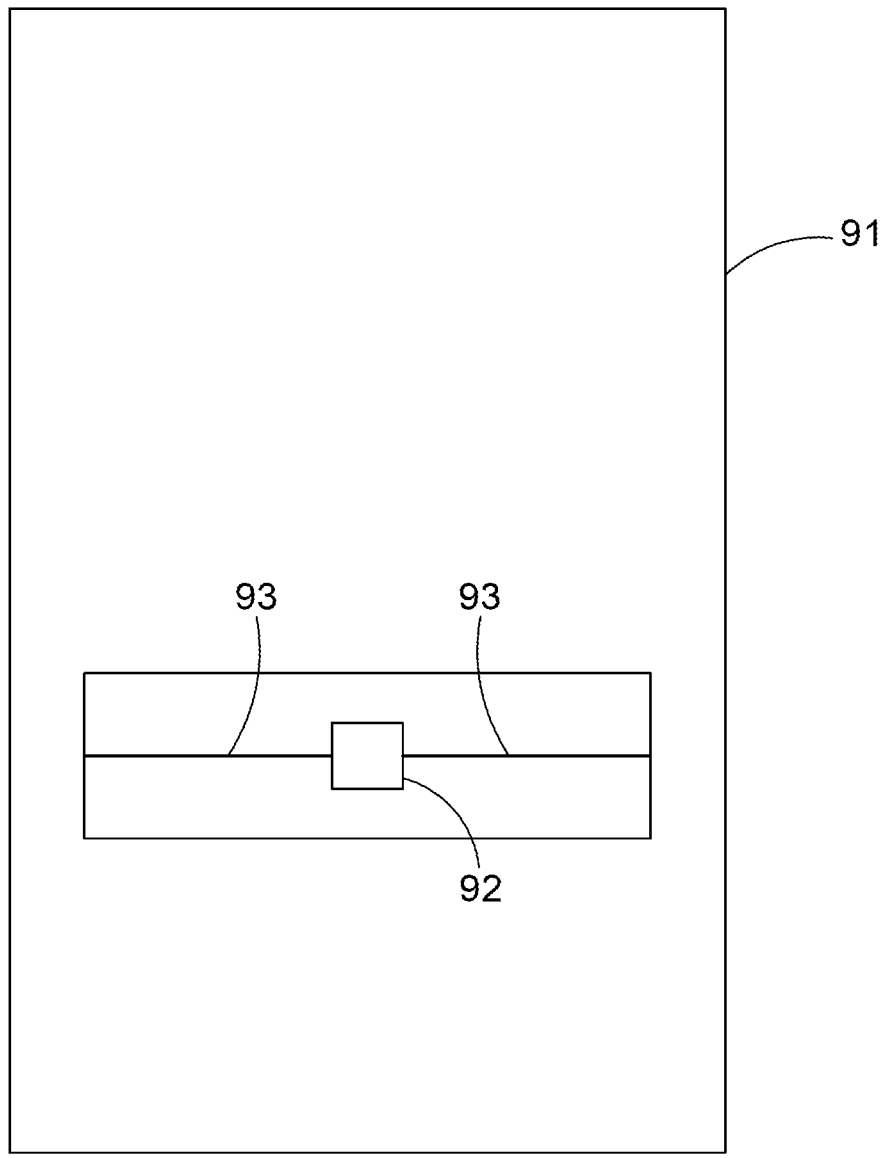
FIG. 1 shows a schematic diagram of the architecture of the inertial sensor according to the prior art.

To illustrate, in the following, a three-axis coordinate system is adopted to describe the inertial sensor according to the first embodiment, where a first axis x, a second axis y, and a third axis z are mutually perpendicular. On the x-y plane formed by the first axis x and the second axis y, the proof mass 1, for easier manufacturing, is normally designed to be a square or a rectangle with the short side parallel with the first axis x. The anchor 2 is a fixed point in the system architecture and disposed on one side of the proof mass 1 along the first axis x. Namely, according to the figure, the anchor 2 is disposed on the left or right side of the proof mass 1 along the first axis x (the right side for the example in FIG. 1). The flexible member 3 is connected to the anchor 2 and extends along the first axis x towards the proof mass 1 for connecting to the proof mass 1.

The anchor 2 is located at the center of the proof mass 1 along the second axis y. To elaborate, according to the figure, the anchor 2 is distant from the top edge of the proof mass 1 by a first gap G1 along the second axis y and from the bottom edge of the proof mass 1 by a second gap G2. The first gap G1 is not equal to the second gap G2. For the example in FIG. 1, the first gap G1 is greater than the second gap G2. Thereby, the weight distribution of the proof mass 1 on both sides of the anchor 2 along the second axis y is not equal. When an inertial force is applied to the proof mass 1 in a specific direction (for example, in the direction along the third axis z), the proof mass 1 will tilt. The operation will be described as follows.

The flexible member 3 can be a spring or other flexible member structures formed by other flexible materials. The flexible member 3 is connected to a joint 11 of the proof mass 1. According to the present embodiment, the flexible member 3 is the only flexible member connected to the proof mass 1. The longer the length of the flexible member 3 along the first axis x, the easier it will deform. According to the present embodiment, the length L of the flexible member 3 along the first axis x is preferably greater than 50% of the width W of the proof mass 1 along the first axis x. The length L of the flexible member 3 is the distance between the joint 11 of the proof mass 1 and the anchor 2 along the first axis x. The width of the proof mass 1 is the maximum width of the proof mass 1 along the first axis x. In other words, the flexible member 3 preferably extends from the anchor 2 along the first axis x and exceeds 50% of the width of the proof mass 1.

The plurality of sensing electrodes 41, 42, 43 are used for sensing the deformation of the flexible member 3 along different axes, respectively. For example, a first sensing electrode 41 can be disposed on a top surface of the proof mass 1 along the third axis z for sensing the motion of the proof mass 1 when an inertial force in the first axis x is applied. Likewise, a second sensing electrode 42 can be disposed on a top surface of the proof mass 1 for sensing the motion of the proof mass 1 when an inertial force in the second axis y is applied; and a third sensing electrode 43 can be disposed on a bottom surface of the proof mass 1 along the third axis z for sensing the motion of the proof mass 1 when an inertial force in the third axis z is applied.

Figure 3A:
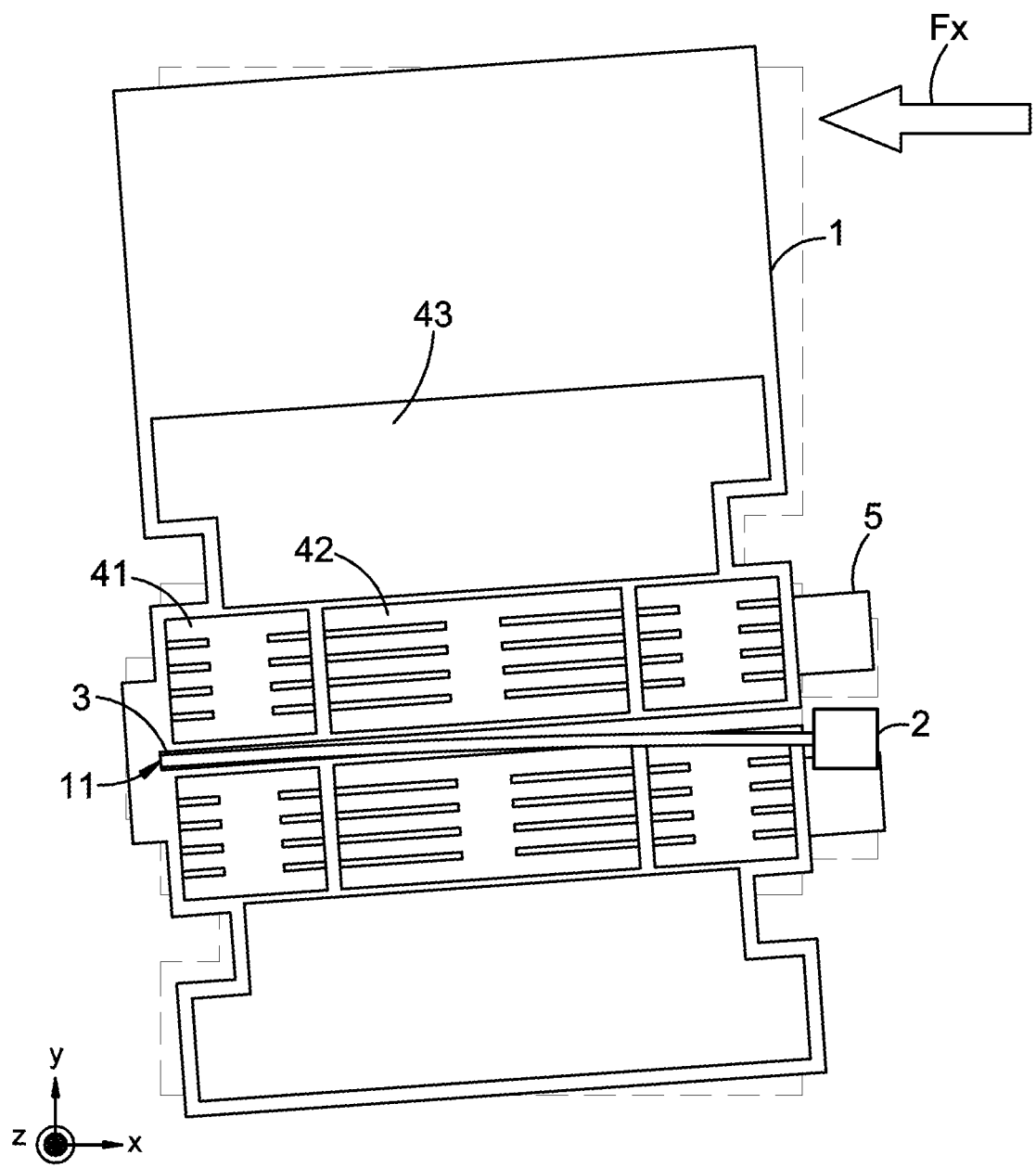
FIG. 3a shows a schematic diagram of the mechanism according to the first embodiment of the present application.
Figure 3B:
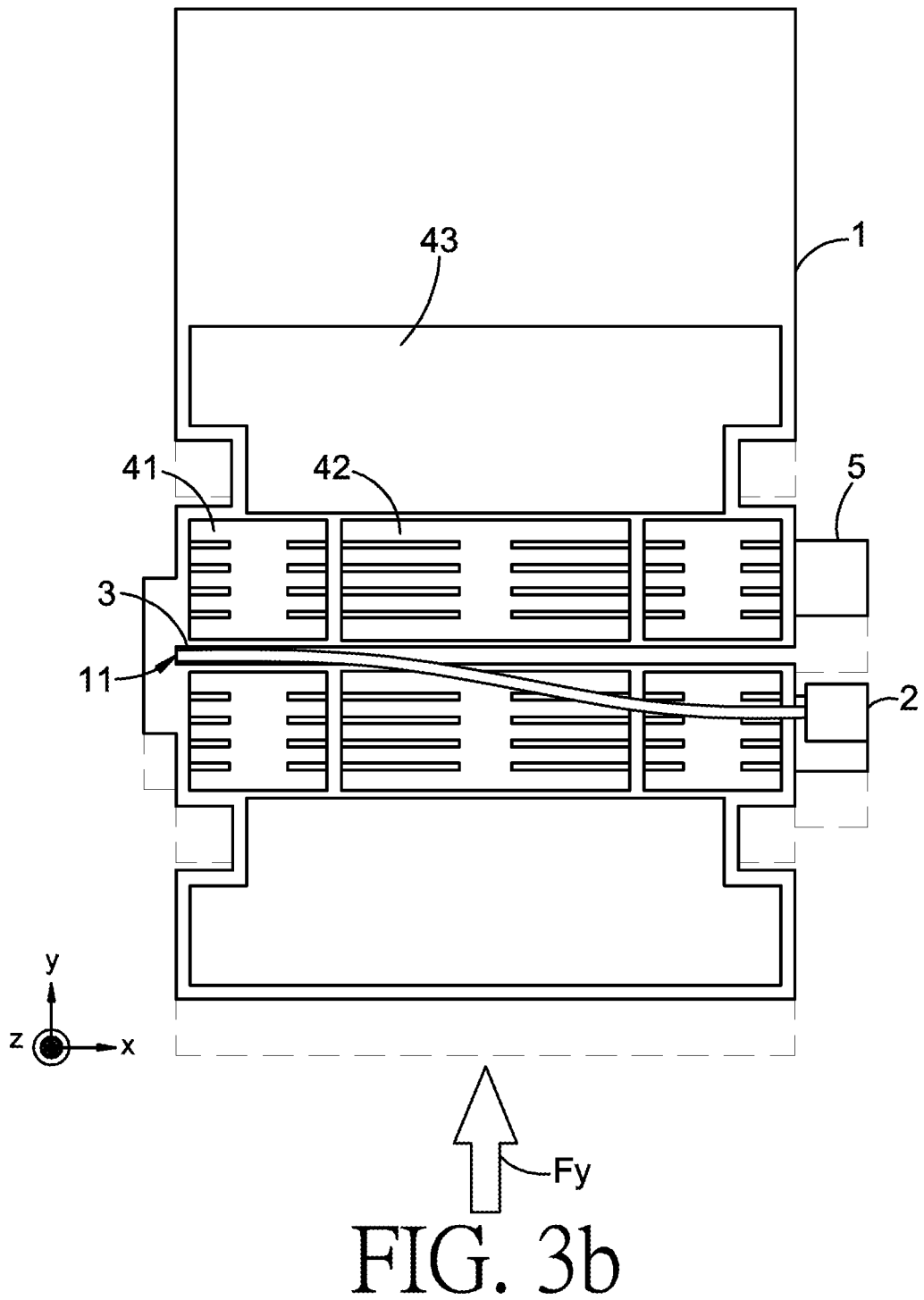
FIG. 3b shows a schematic diagram of the structure and the mechanism according to the second embodiment of the present application.
Figure 3C:
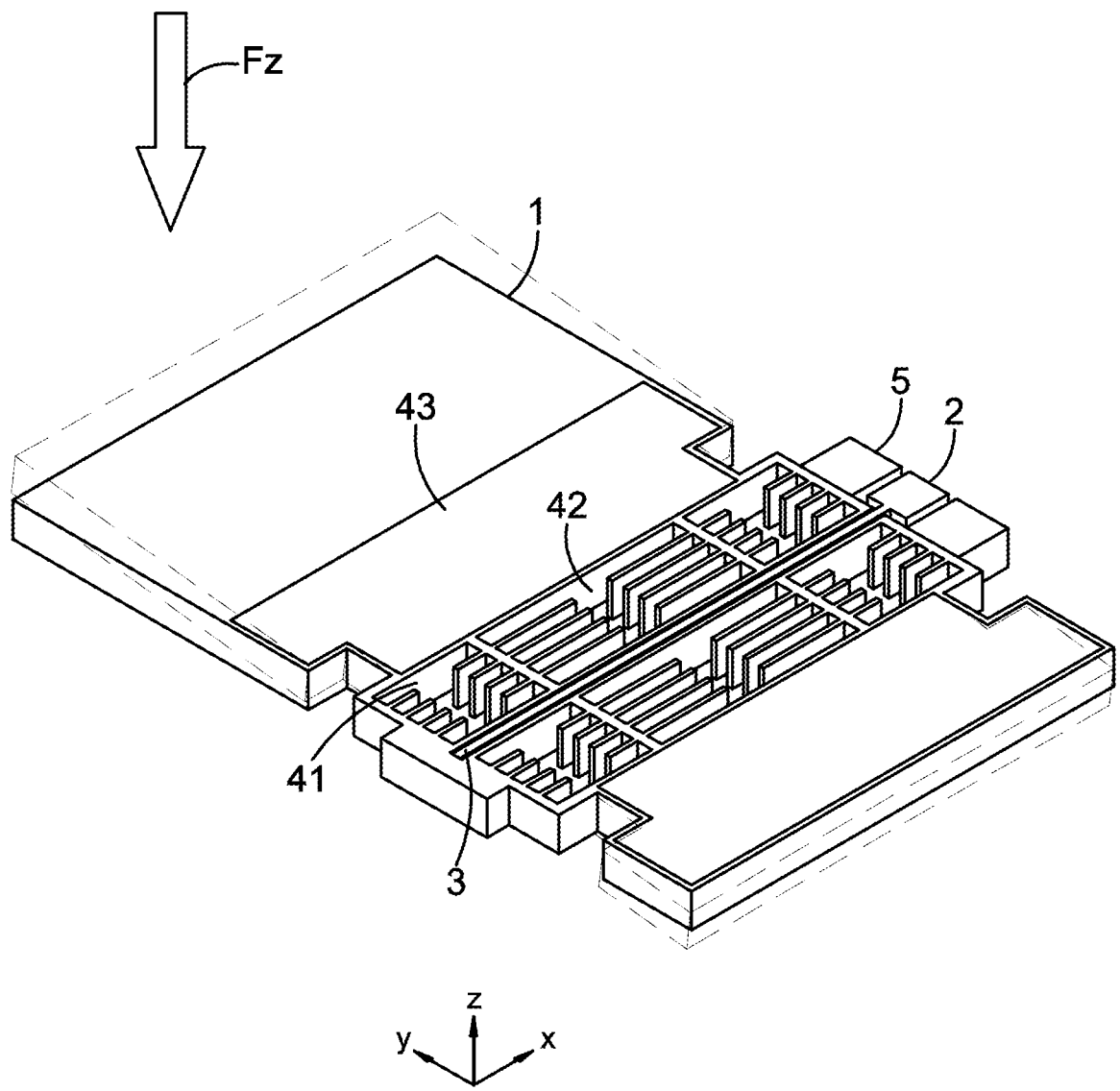
FIG. 3c shows a structural schematic diagram according to the third embodiment of the present application.

In the following, examples in figures will be used to illustrate the possible motions of the flexible member 3 when inertial forces in various directions are applied. As shown in FIG. 3a, when an inertial force Fx in the first axis x is applied, the proof mass 1 will rotate and hence the flexible member 3 will tilt and deform with respect to the anchor 2. The first sensing electrode 41 can be used to sense the motion of the proof mass 1 when an inertial force in the first axis x is applied. As shown in FIG. 3b, when an inertial force Fy in the second axis y is applied, the proof mass 1 will move. Since one end of the flexible member 3 is connected to the anchor 2 (no displacement) and the other end connected to the joint 11 of the proof mass 1 (with displacement), the flexible member 3 will bend. The second sensing electrode 42 can be used to sense the motion of the proof mass 1 when an inertial force in the second axis y is applied. As shown in FIG. 3c, when an inertial force Fz in the second axis z is applied, since the weights on both sides of the anchor 2 along the second axis y are not equal, the proof mass 1 will tilt away from the x-y plane and hence twisting and deforming the flexible member 3. The third sensing electrode 43 can be used to sense the motion of the proof mass 1 when an inertial force in the third axis z is applied.

It is noteworthy that the proof mass 1 includes a center of mass 1' while the flexible member 3 also include a center of mass 3'. The proof mass 1 will rotate when an inertial force in a specific direction (for example, the first axis x) is applied. At this moment, the center of mass 3' of the flexible member 3 is preferably located close to the center of rotation of the proof mass 1 to benefit judging the sensing results of the plurality of sensing electrodes 41, 42, 43. By aligning the center of mass 3' of the flexible member 3 with the center of mass 1' of the proof mass 1 in the first axis x can achieve the above purpose. The so-called alignment includes direct alignment of the center of mass 3' of the flexible member 3 and the center of mass 1' of the proof mass 1 in the first axis x. Alternatively, the gap between the center of mass 3' of the flexible member 3 and the center of mass 1' of the proof mass 1 in the first axis x can be designed to be smaller than 30%, preferably 15%, of the width W of the proof mass 1 in the first axis x. The center of mass 3' of the flexible member 3 can be controlled by the shape of the flexible member 3; the center of mass 1' of the proof mass 1 can be controlled by the shape of the proof mass 1. Alternatively, one or more balance mass 5 can be attached to the proof mass 1 for controlling the center of mass 1'.

Likewise, the proof mass 1 will tilt when an inertial force in a specific direction (for example, the third axis z) is applied. The center of mass 3' of the flexible member 3 is preferably located close to the center of tilt of the proof mass 1. According to the embodiments of the present application as disclosed above, a person having ordinary skill in the art can control the center of tile of the proof mass 1 using similar schemes. By disposing the balance mass 5 on the periphery of the anchor 2, the tilt motion of the proof mass 1 can be stabilized.

Figure 4:
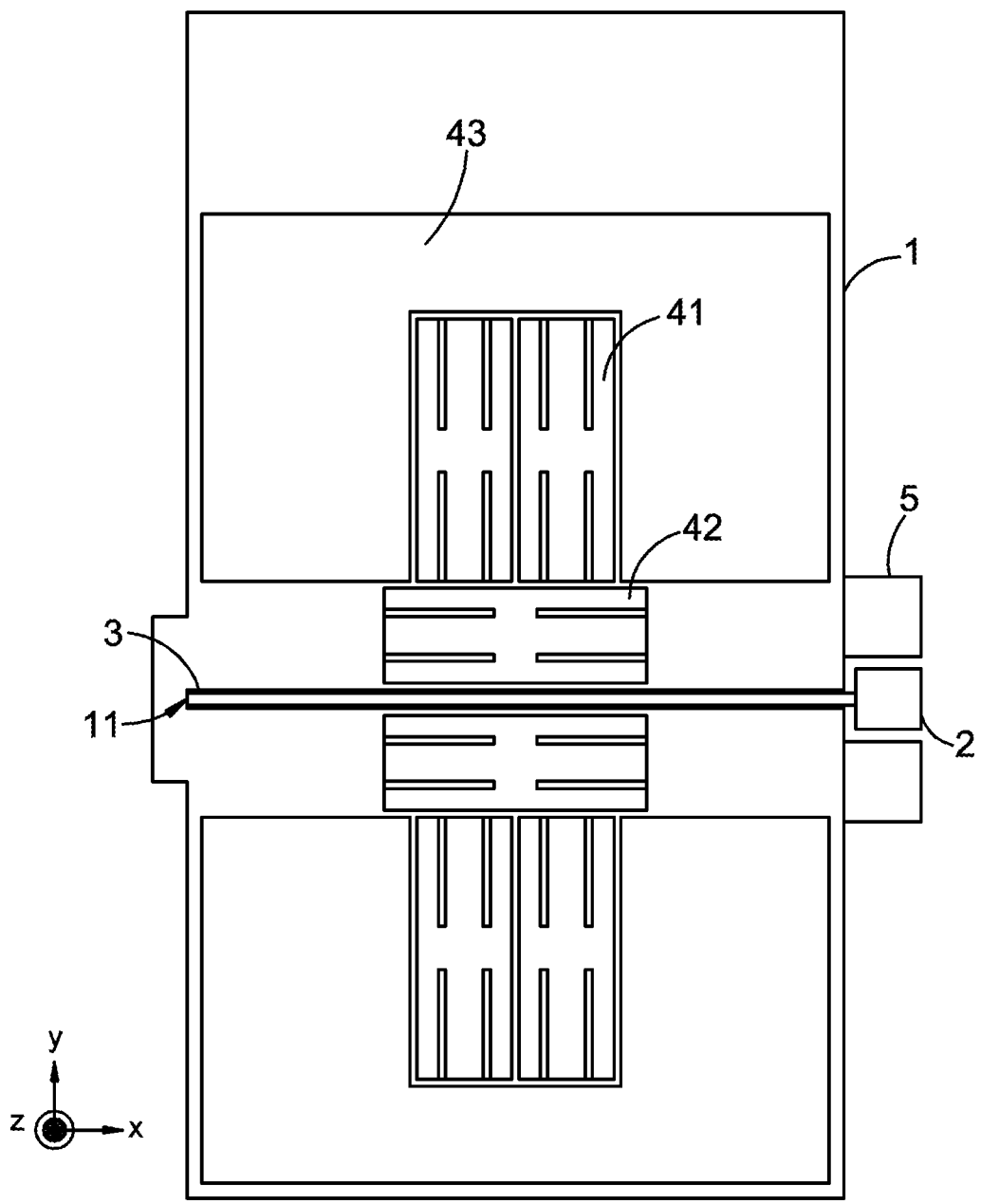
FIG. 4 shows a structural schematic diagram of the inertial sensor according to the second embodiment of the present application.

On the other hand, the variation in the flexible member 3 can be sensed by using the variation in capacitance or other electrical characteristics of the plurality of sensing electrodes 41, 42, 43. Thereby, the area of the plurality of sensing electrodes 41, 42, 43 should not be small. To ensure sufficient space for the plurality of sensing electrodes 41, 42, 43, according to the first embodiment shown in FIG. 2, the first, second, and third sensing electrodes 41, 42, 43 are disposed on two surfaces of the proof mass 1 along the third axis z. Nonetheless, the present application is not limited to the embodiment. In addition, according to the first embodiment shown in FIG. 2, although the first sensing electrode 41 is disposed o both sides of the second sensing electrode 42 along the first axis x, the present application is not limited to the embodiment. Please refer to FIG. 4, which shows a structural schematic diagram of the inertial sensor according to the second embodiment of the present application. The first sensing electrode 41 according to the present embodiment can be disposed on both sides of the second sensing electrode 42 along the second axis y. In general, when the proof mass 1 is designed to be a square or a rectangle similar to a square on the x-y plane, the arrangement for the sensing electrodes according to the embodiment in FIG. 2 will be preferred. Contrarily, when the proof mass 1 is designed to be a long-and-narrow rectangle on the x-y plane, the arrangement for the sensing electrodes according to the second embodiment in FIG. 4 will be preferred.

Figure 5A:
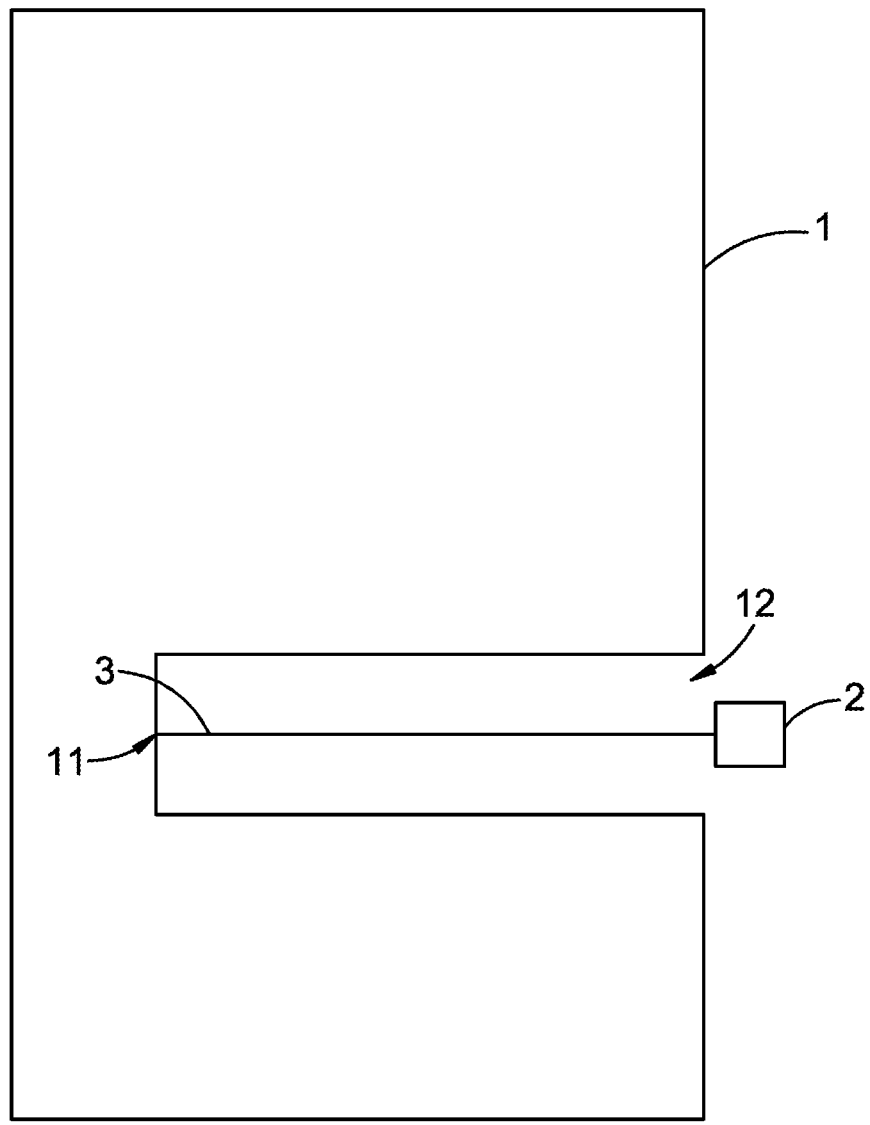
FIG. 5a shows a schematic diagram of the architecture of the inertial sensor according to an embodiment of the present application.
Figure 5B:
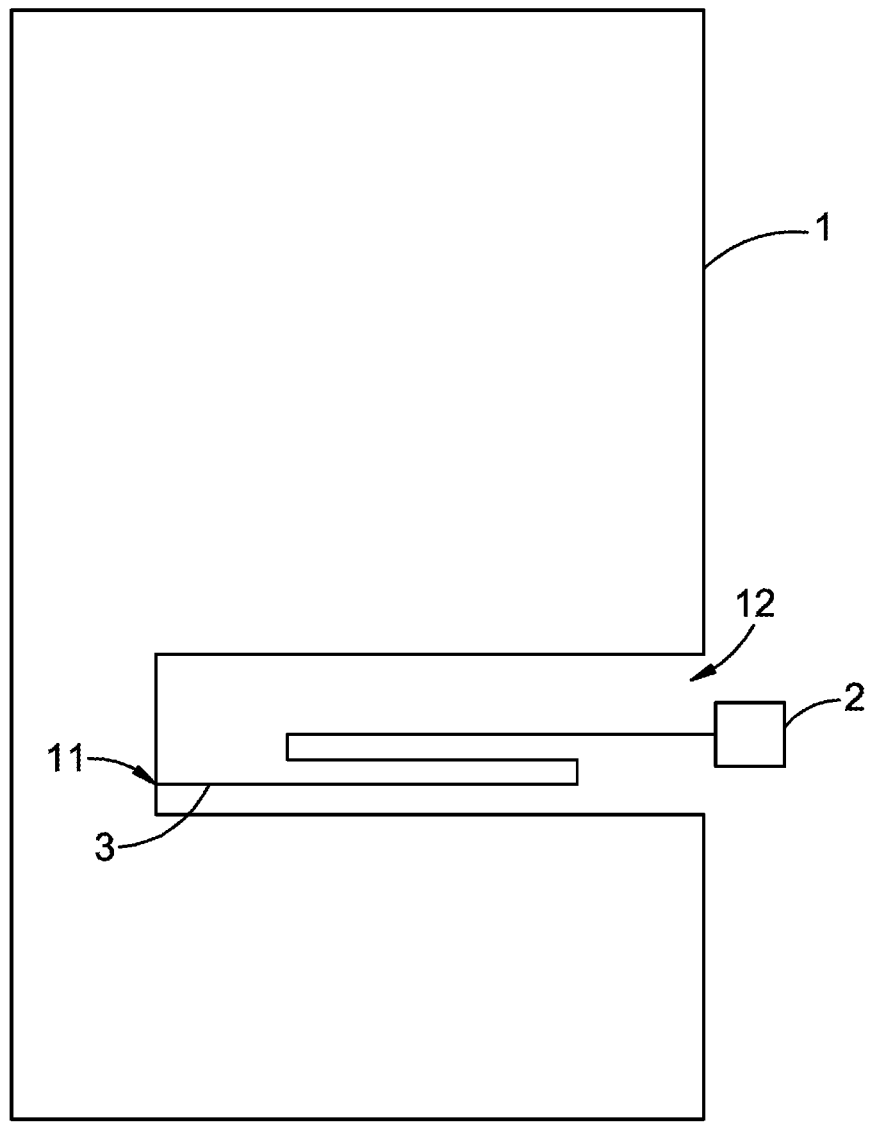
FIG. 5b shows a schematic diagram of the architecture of the inertial sensor according to another embodiment of the present application.

To sum up, please refer to FIG. 5a, which shows a schematic diagram of the architecture of the inertial sensor according to an embodiment of the present application. By comparing with the inertial sensor in FIG. 1, it is found that the stress concentration problem can be prevented by adopting the asymmetrical structure with a single flexible member 3 connected to the anchor 2. According to the schematic diagrams shown in FIG. 3a, FIG. 3b, and FIG. 3c, it is found that no matter the proof mass 1 experiences inertial forces in any direction, the influence of rotation, displacement, or tilt motions on the flexible member 3 will be distributed over the whole flexible member 3. Consequently, even the inertial sensor according to the present application endures the stress much higher than normal motions, no damage or even breakage will occur due to the force. Besides, compared to the inertial sensor according to the prior art in which the cross-sectional area of various flexible members 3 should be shrunk as small as possible, the distribution of the flexible member 3 in the inertial sensor according to the present application can be wider. In some designs, the flexible member 3 can be greater than 50% of the width W of the proof mass 1, which is not possible in the inertial sensor according to the prior art. Thereby, compared to the prior art, the cross-sectional area of the flexible member 3 in the inertial sensor according to the present application promises more design space and hence lowering the difficulty in the production and assembly of the flexible member 3 effectively. With a larger cross-sectional area of the flexible member 3, the present application can prevent the damages by the stress as described above on the flexible member 3 and thus enhancing the product reliability.

Moreover, in FIG. 2 to FIG. 5, although the flexible member 3 is represented by a column, a person having ordinary skill in the art can understand that the proof mass 1 includes an accommodating space 12 for accommodating the flexible member 3. Please refer to FIG. 5b, which shows a schematic diagram of the architecture of the inertial sensor according to another embodiment of the present application. When possible, the flexible member 3 can be a flexible member folded in the accommodating space 12, allowing the designer to control the elasticity in terms of the center of mass, coefficient of elasticity, and deformation of the flexible member 3.

Accordingly, the present application conforms to the legal requirements owing to its novelty, nonobviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

The invention claimed is:

1. An inertial sensor, comprising:
a proof mass connected with a balance mass;
an anchor, disposed on one side of said proof mass along a first axis, wherein the balance mass is disposed on a periphery of the anchor;
a flexible member, connected to said anchor, and extending towards said proof mass along said first axis for connecting to said proof mass; and
a plurality of sensing electrodes, disposed on said proof mass.

2. The inertial sensor of claim 1, wherein a second axis is perpendicular to said first axis; a first gap is located between said anchor and one side of said proof mass along said second axis; a second gap is located between said anchor and the other side of said proof mass along said second axis; and said first gap is not equal to said second gap.

3. The inertial sensor of claim 1, wherein a length of said flexible member along said first axis is greater than 50% of a width of said proof mass along said first axis.

4. The inertial sensor of claim 3, wherein said flexible member is connected to a joint of said proof mass; the length of said flexible member is a distance between said joint of said proof mass and said anchor along said first axis; and the width of said proof mass is a maximum width of said proof mass along said first axis.

5. The inertial sensor of claim 1, wherein a second axis is perpendicular to said first axis; a third axis is perpendicular to said first axis and said second axis, respectively; and said plurality of sensing electrodes includes:
a first sensing electrode, used for sensing a motion of said proof mass while forced by a first-axis inertial force;
a second sensing electrode, used for sensing the motion of said proof mass while forced by a second-axis inertial force; and
a third sensing electrode, used for sensing the motion of said proof mass while forced by a third-axis inertial force.

6. The inertial sensor of claim 5, wherein while forced by said first-axis inertial force, said proof mass rotates; while forced by said second-axis inertial force, said proof mass moves; while forced by said third-axis inertial force, said proof mass tilts and departs from the plane formed by said first axis and said second axis.

7. The inertial sensor of claim 1, wherein a center of mass of said flexible member aligns with a center of mass of said proof mass in said first axis.

8. The inertial sensor of claim 7, wherein said alignment includes aligning said center of mass of said flexible member and said center of mass of said proof mass in said first axis.

9. The inertial sensor of claim 7, wherein said alignment includes aligning said center of mass of said flexible member and said center of mass of said proof mass in said first axis within a gap smaller than 30% of a width of said proof mass along said first axis; and the width of said proof mass is a maximum width of said proof mass along said first axis.

10. The inertial sensor of claim 9, wherein a gap between said center of mass of said flexible member and said center of mass of said proof mass in said first axis is smaller than 15% of the width of said proof mass.

11. The inertial sensor of claim 1, wherein said flexible member is the only flexible structure connected to said proof mass.

12. The inertial sensor of claim 1, wherein a second axis is perpendicular to said first axis; and said proof mass is a square on the plane formed by said first axis and said second axis.

13. The inertial sensor of claim 1, wherein a second axis is perpendicular to said first axis; and said proof mass is a rectangle with a short side parallel with said first axis on the plane formed by said first axis and said second axis.

14. The inertial sensor of claim 1, wherein said proof mass includes an accommodating space for accommodating said flexible member; and said flexible member is a flexible structure folded in said accommodating space.

\* \* \* \* \*